United States Patent
Edelman et al.

(10) Patent No.: US 6,281,601 B1
(45) Date of Patent: Aug. 28, 2001

(54) TURBOGENERATOR POWER CONTROL SYSTEM AND METHOD

(75) Inventors: Edward C. Edelman, Agoura Hills; Mark G. Gilbreth, Woodland Hills; Joel B. Wacknov, Thousand Oaks, all of CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/360,043

(22) Filed: Jul. 23, 1999

(51) Int. Cl.[7] .............................. H02P 9/04; F01D 15/10; H02J 1/16
(52) U.S. Cl. .............................. 307/29; 307/47; 290/52
(58) Field of Search ........................ 307/29, 31, 44, 307/45, 47; 290/52

(56) References Cited

U.S. PATENT DOCUMENTS

| | | | |
|---|---|---|---|
| 4,262,209 | * 4/1981 | Berner | 307/44 |
| 4,731,547 | 3/1988 | Alenduff et al. | |
| 4,994,981 | 2/1991 | Walker et al. | |
| 5,168,208 | 12/1992 | Schultz et al. | |
| 5,302,906 | 4/1994 | Lerch | |
| 5,321,308 | 6/1994 | Johncock | |
| 5,336,991 | * 8/1994 | Atherton et al. | 324/142 |
| 5,390,068 | * 2/1995 | Schultz et al. | 361/95 |
| 5,483,147 | 1/1996 | Ilic et al. | |
| 5,610,501 | 3/1997 | Nelson et al. | |
| 5,635,768 | 6/1997 | Birch et al. | |
| 5,642,007 | 6/1997 | Gyugyi et al. | |
| 5,734,257 | 3/1998 | Schauder et al. | |
| 6,023,135 | * 2/2000 | Gilbreth et al. | 290/52 |
| 6,031,294 | * 2/2000 | Geis et al. | 290/52 |
| 6,032,459 | * 3/2000 | Skowronski | 60/39.511 |
| 6,055,163 | * 4/2000 | Wagner et al. | 363/37 |
| 6,093,975 | * 7/2000 | Peticolas | 290/52 |
| 6,169,334 | * 1/2001 | Edelman | 290/52 |

* cited by examiner

Primary Examiner—Josie Ballato
Assistant Examiner—Rios Roberto
(74) Attorney, Agent, or Firm—Irell & Manella, LLP

(57) ABSTRACT

The power meter, required in most utility grid connectged applications to measure load consumption, is utilized to provide a feedback to an associated turbogenerator power controller, providing a control system for peak shaving, load following, reactive power control, reverse flow protection and load analysis for scheduled turbogenerator operation. This control system operates with simple discrete signals for peak shaving operation, to more complex pulse signals for load following, to load profile analysis and scheduled operation based on a microprocessor based serial input from a digital power meter.

3 Claims, 8 Drawing Sheets

TURBOGENERATOR POWER CONTROL SYSTEM AND METHOD

TECHNICAL FIELD

This invention relates to the general field of turbogenerator power control, and more particularly the method and control of a system that utilizes a turbogenerator and power controller in combination with a utility power meter, connected or paralleled to the utility grid to provide load control, peak shaving, load following, and reactive power control.

BACKGROUND OF THE INVENTION

In most utility grid connected applications, a utility power meter that measures the load consumption (or production when a turbogenerator system is installed) in a building or application is required. This power meter provides a feedback to the turbogenerator power controller. If a building or application requires power, the power controller sequences the turbogenerator to meet the demand.

Load management in a building can be implemented in varying degrees of complexity. The simplest application or installation is where the total load consumption is measured by a utility meter, and the turbogenerator load is switched on (maximum power) and off. Generally, for this application, the meter measures the total load consumption in a building. When the load exceeds a predetermined limit, the turbogenerator is switched to maximum power. This method of control is commonly referred to as load dispatch control.

Load transients in the load dispatch control mode have a large impact on the output of the total system. Sudden decreases in load may cause the system to back feed onto the utility grid for a short time until the turbogenerator energy can be dissipated. Rapid increases in load require the utility grid to supply power for a short time until the turbogenerator power output can be increased.

This constant changing in power demand can greatly reduce the operating efficiency of the turbogenerator system and lead to increased operating costs.

SUMMARY OF THE INVENTION

To prevent constant acceleration and deceleration of the engine to meet the changing load demand, the turbogenerator power control system and method of the present invention incorporates control strategies to vary power output based on the utility rate schedule. For example, if the utility rate is based on the peak power consumption over a 15-minute period the system can be programmed to meet the building load over that time period. This time averaged, load following setpoint allows the control system to slow or limit the rate of acceleration or deceleration, and reduce the starting and stopping of the turbogenerator, thereby increasing the overall efficiency of the system.

This invention describes the use of a turbogenerator for: (1) load control, where a discrete control signal is received by the turbogenerator power controller for the purposes of load management; (2) load following, where the total power consumption in a building or application is measured by a bi-directional power meter, and the turbogenerator system equalizes or meets the demand; (3) peak shaving, where the total power consumption in a building or application is measured by a power meter, and the turbogenerator system reduces the utility consumption to a fixed load, thereby reducing the utility rate schedule and increasing the overall economic return of the turbogenerator, (4) regulating both the building or load's real power and reactive power to reduce the total power consumption; and (5) utilizing a microprocessor based digital power meter for monitoring long term load profiles for scheduled operation of the turbogenerator system.

BRIEF DESCRIPTION OF THE DRAWINGS

Figure 1:
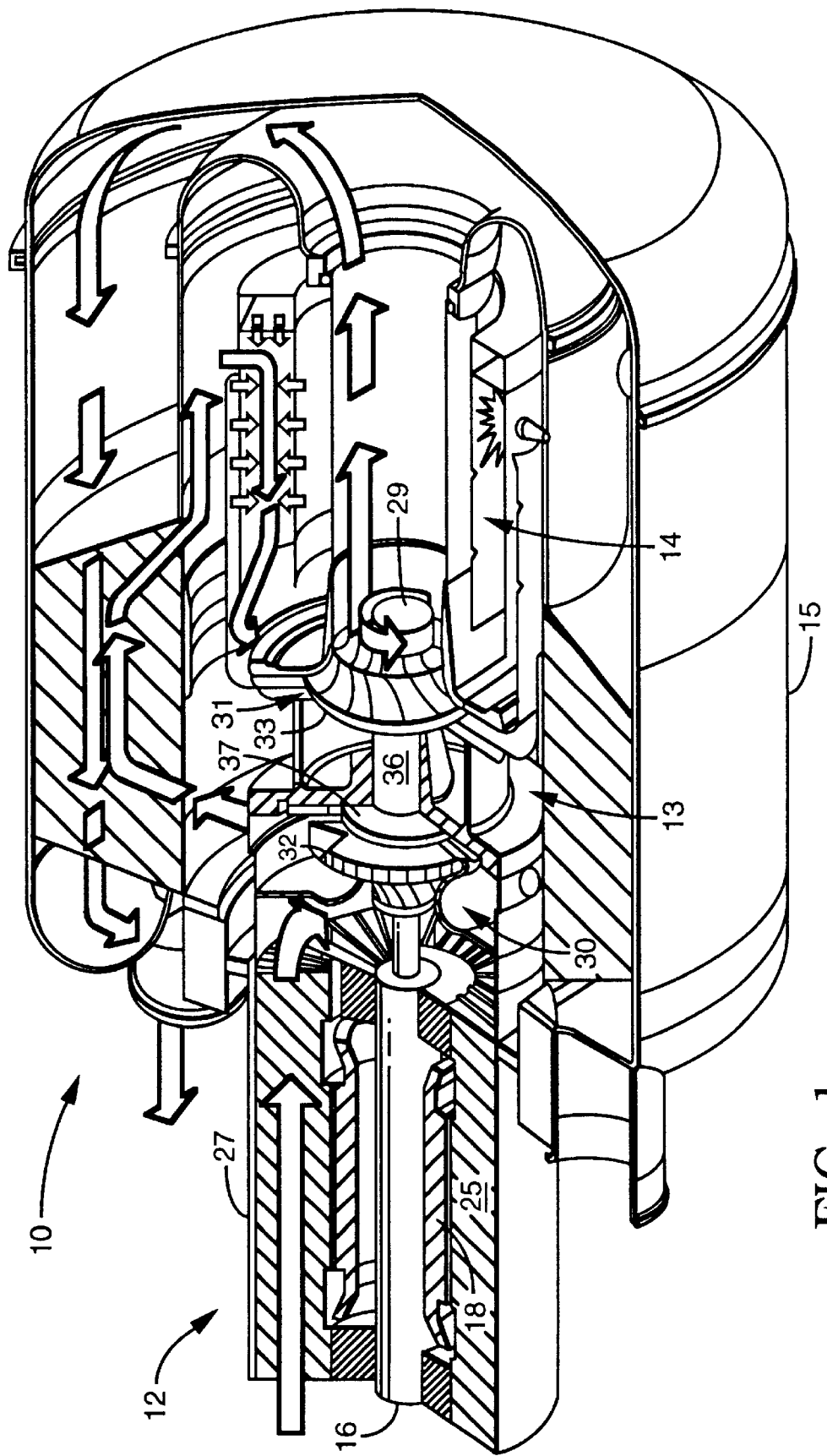
Figure 2:
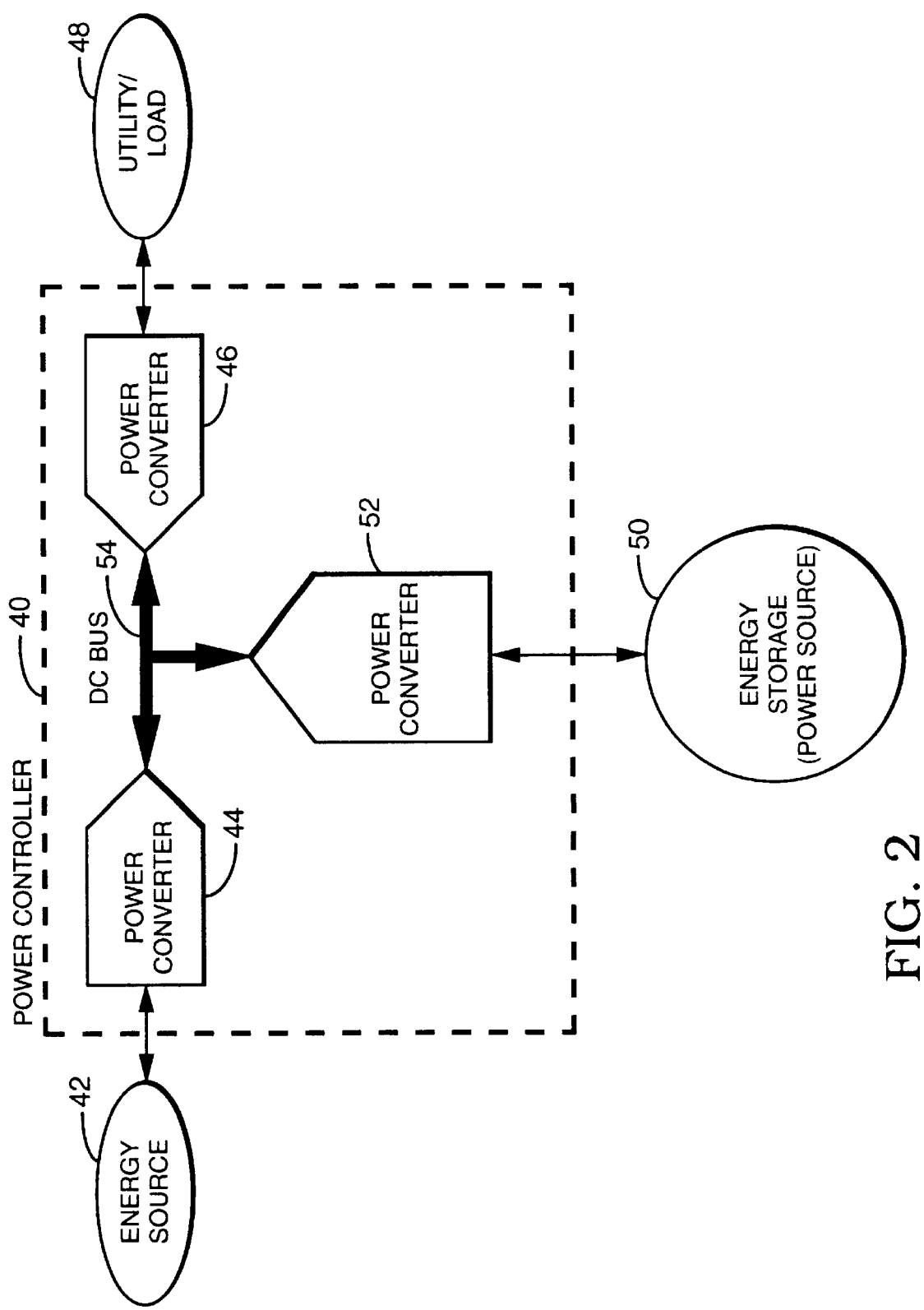
Figure 3:
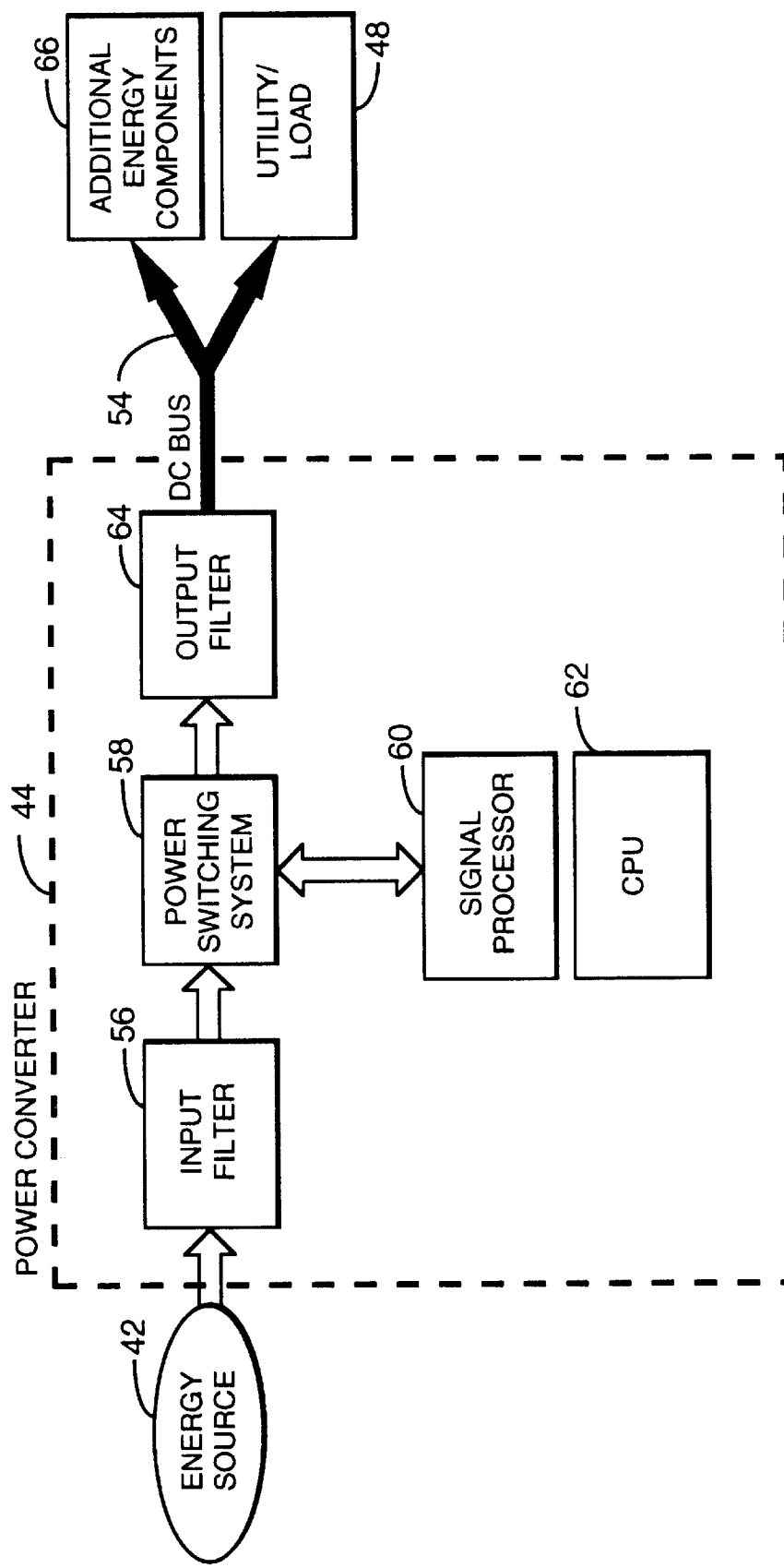
Figure 4:
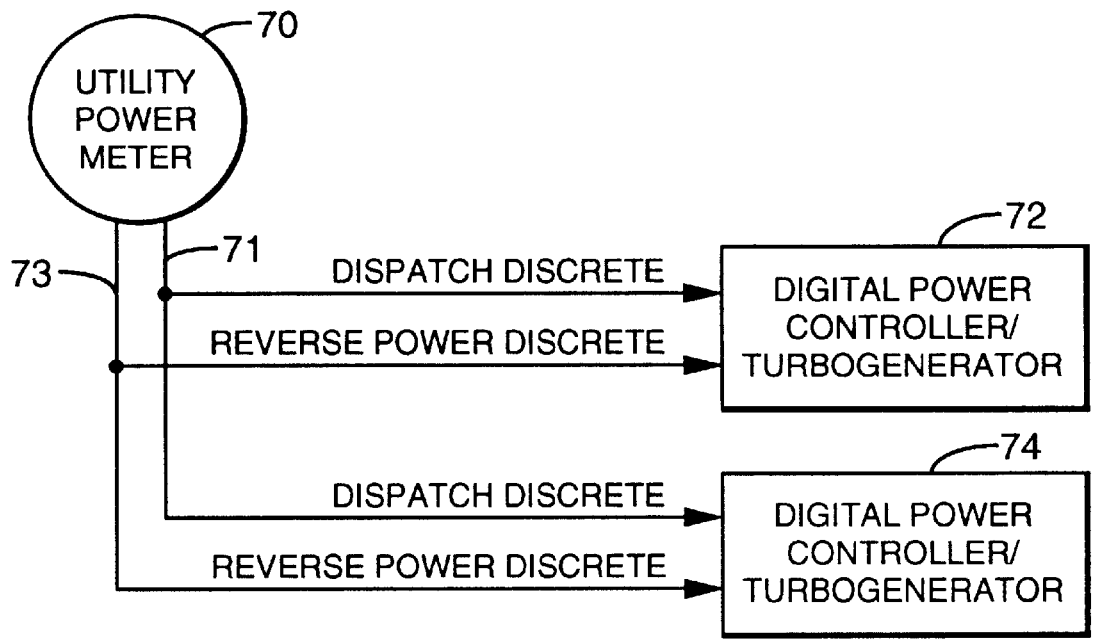
Figure 5:
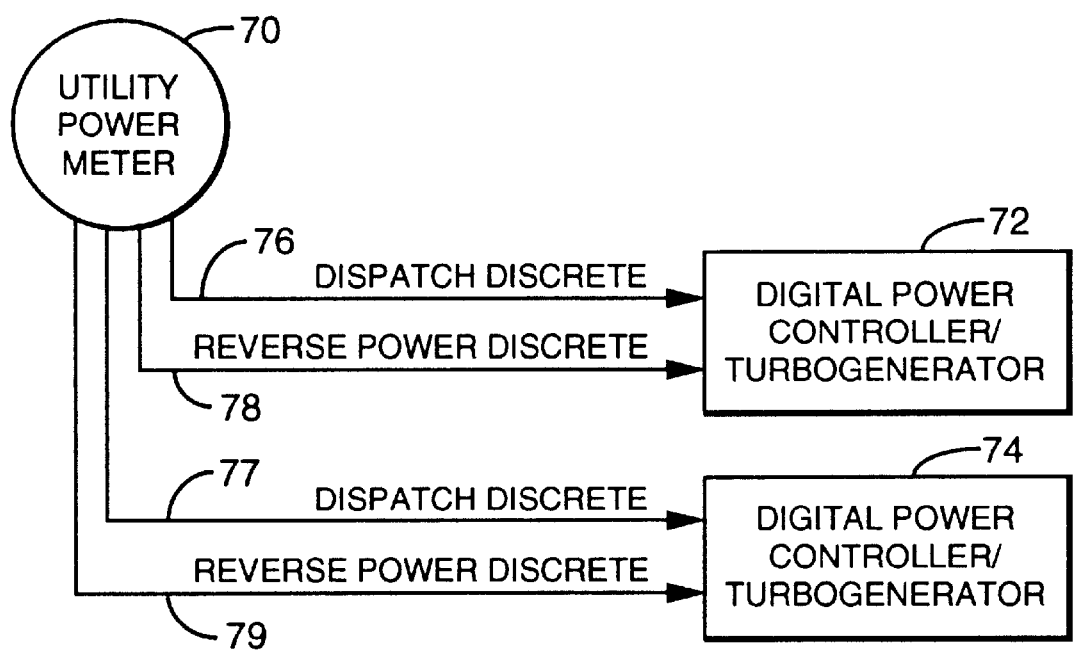
Figure 6:
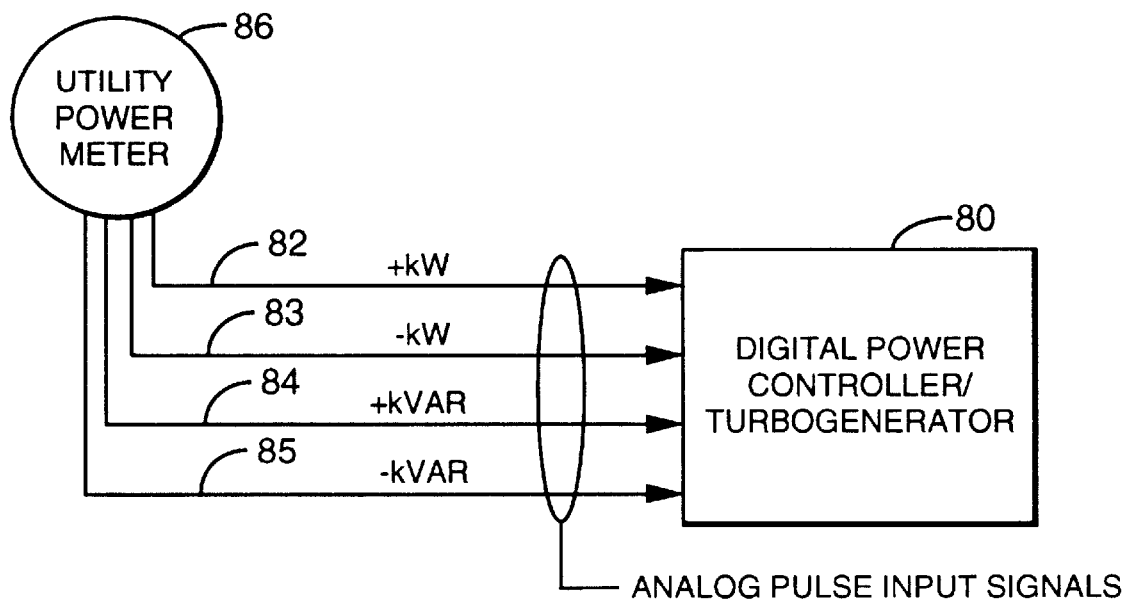
Figure 7:
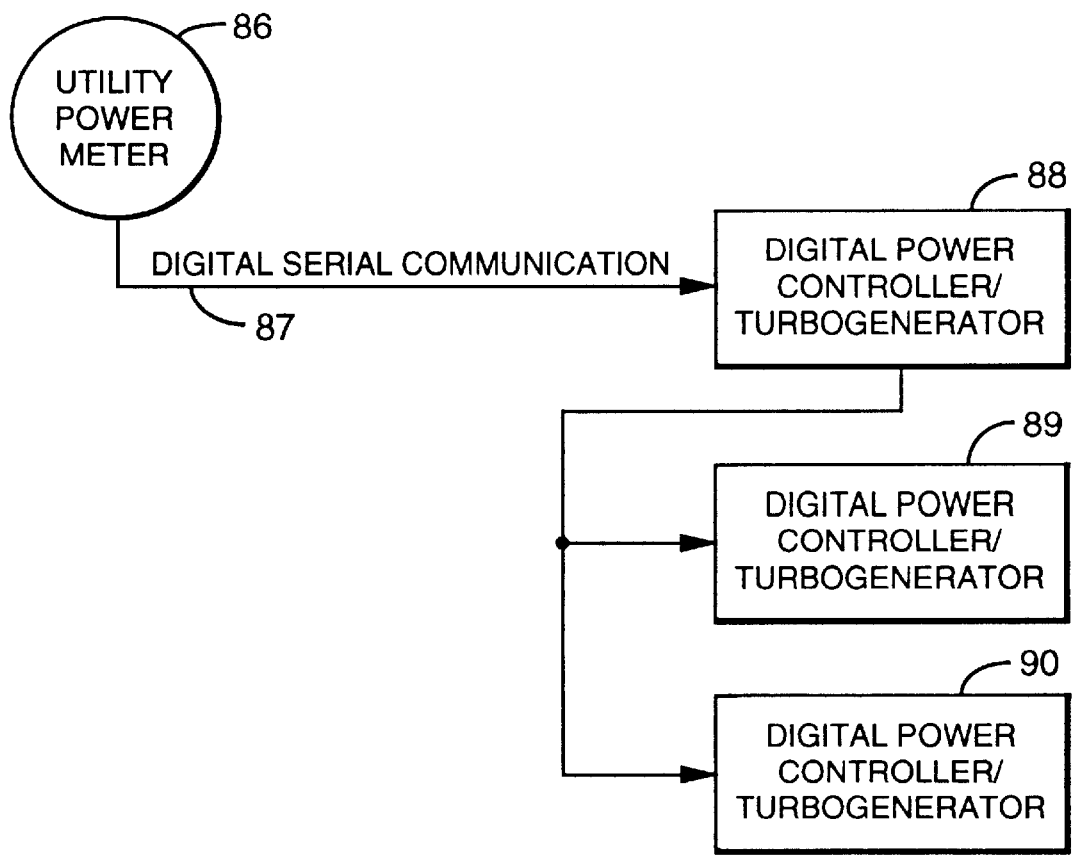
Figure 8:
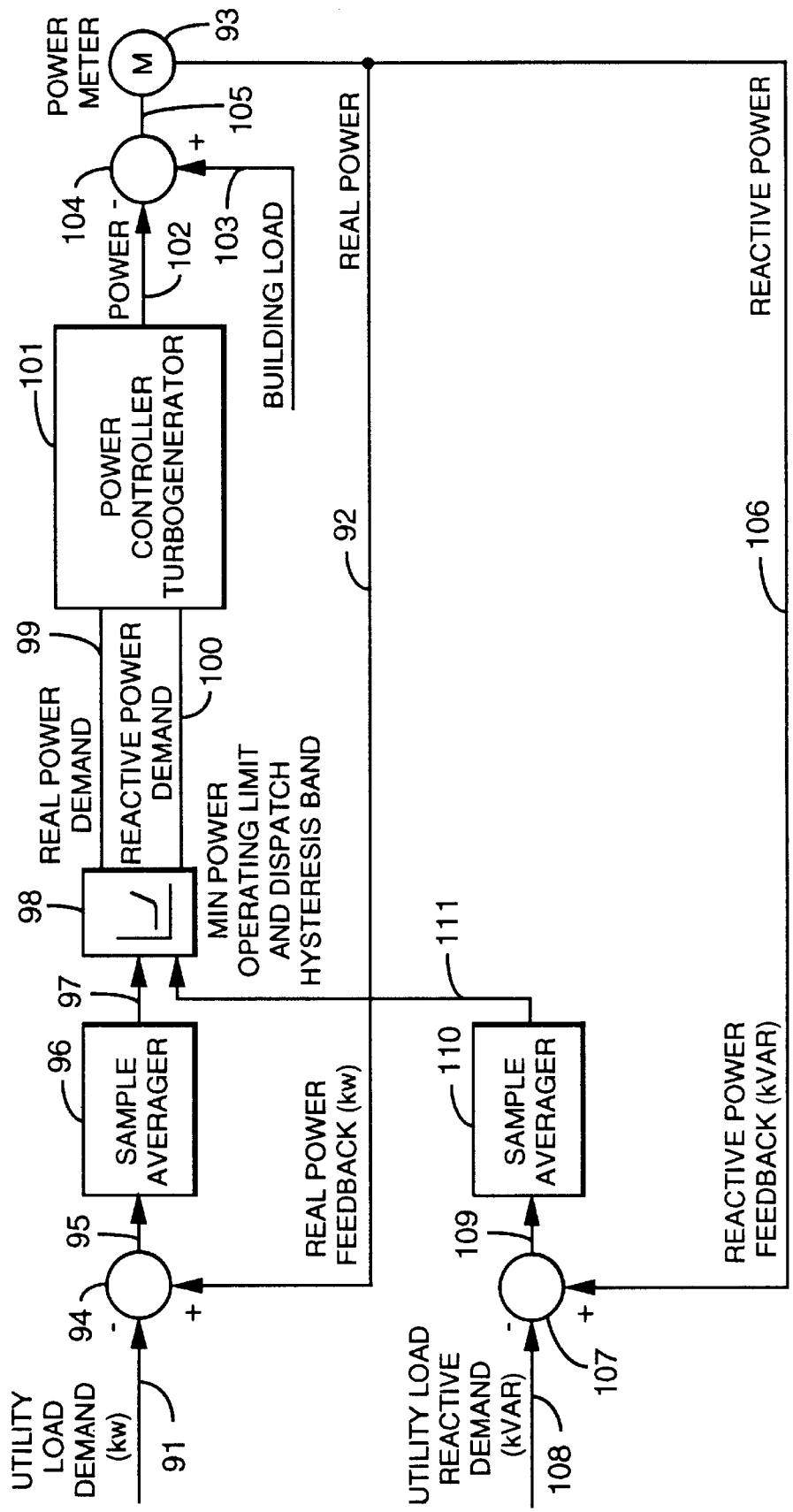
Figure 9:
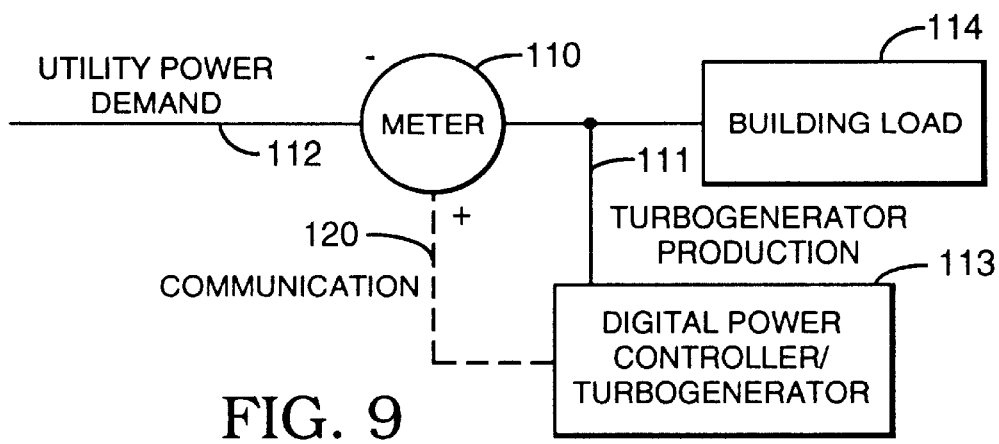
Figure 10:
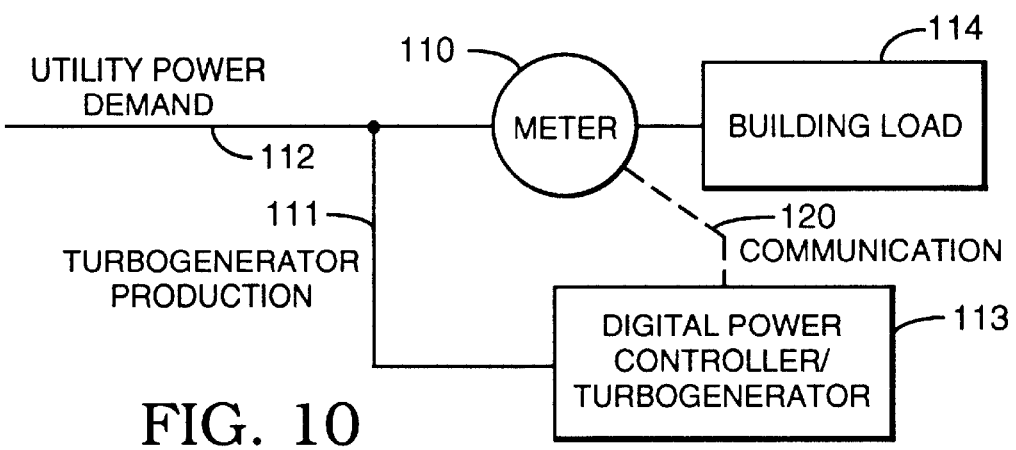
Figure 11:
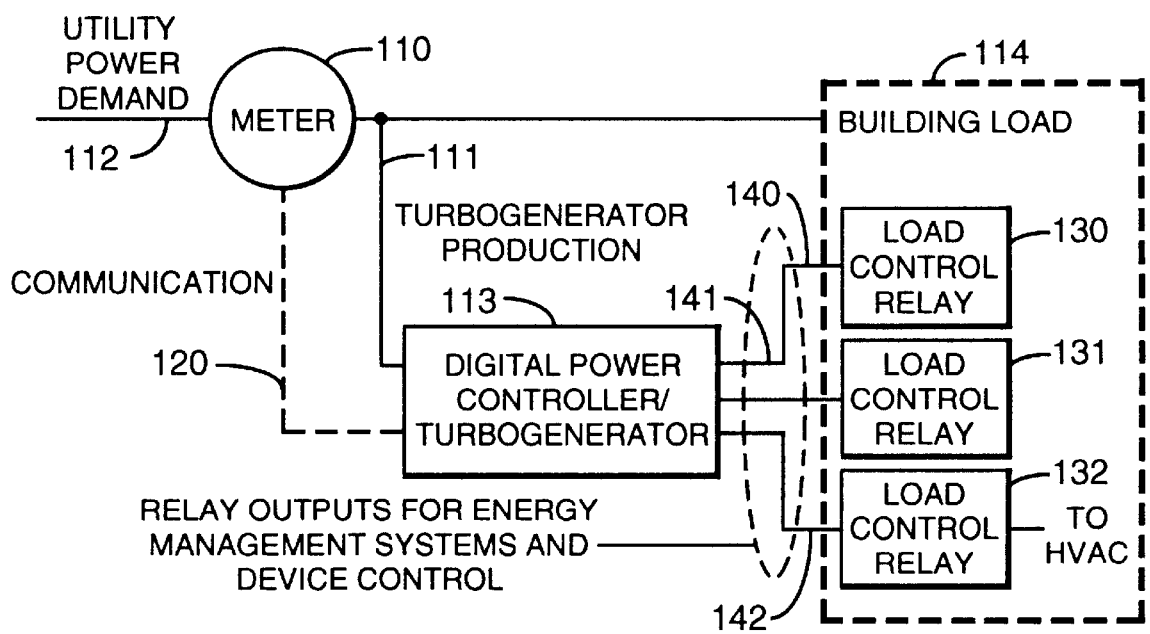
Figure 12:
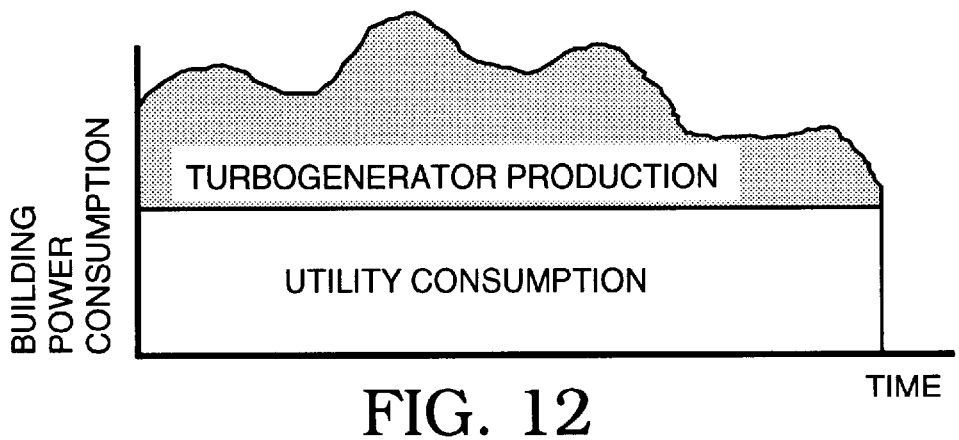
Figure 13:
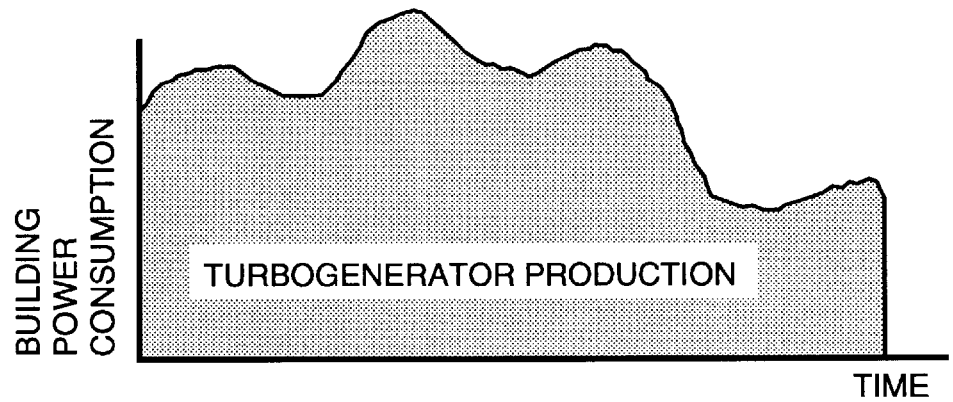
Figure 14:
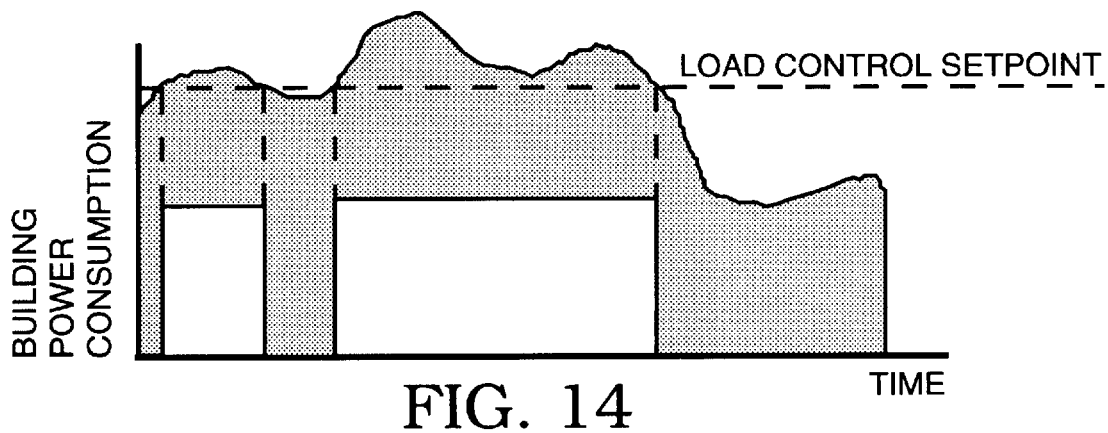

Having thus described the present invention in general terms, reference will now be made to the accompanying drawings in which:

FIG. 1 is a perspective view, partially cut away, of a turbogenerator for use in the power control system and method of the present invention;

FIG. 2 is a detailed block diagram of a power controller for use in the power control system and method of the present invention;

FIG. 3 is a detailed block diagram of the power converter in the power controller illustrated in FIG. 2;

FIG. 4 is a block diagram of the block peak shaving mode of operation;

FIG. 5 is a block diagram of the multiple unit peak shaving mode of operation;

FIG. 6 is a block diagram of the load following mode of operation;

FIG. 7 is a block diagram of the load following mode of operation including a serial communication to a microprocessor based digital power meter;, FIG. 8 is a block diagram of the control operation for the load following mode of operation;

FIG. 9 is the meter arrangement for the peak shaving and the load following modes of operation;

FIG. 10 is the meter arrangement for load dispatch control mode of operation;

FIG. 11 is a block diagram of a total energy management system for use in the power control system and method of the present invention;

FIG. 12 is an example load profile of utility consumption, turbogenerator production vs. building power consumption for the peak shaving mode of operation;

FIG. 13 is an example load profile of turbogenerator production vs. building power consumption for the load following mode of operation; and FIG. 14 is an example load profile of turbogenerator production vs. building power consumption for the load dispatch control mode of operation.

DETAILED DESCRIPTION OF THE PREFERRED EMBODIMENTS

A permanent magnet turbogenerator/motor 10 is illustrated in FIG. 1 as an example of a turbogenerator/motor for use with the power control system of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a permanent magnet motor stator 18 by a pair of spaced journal bearings. Radial stator cooling fins 25 are enclosed in an outer cylindrical sleeve 27 to form an annular air flow passage which cools the stator 18 and thereby preheats the air passing through on its way to the power head 13.

The power head 13 of the permanent magnet turbogenerator/motor 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the permanent magnet motor stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37.

The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face of the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine wheel 33. The expanded turbine exhaust gases are then passed through the recuperator 15 before being discharged from the turbogenerator/motor 10.

The system has a steady-state turbine exhaust temperature limit, and the turbogenerator operates at this limit at most speed conditions to maximize system efficiency. This turbine exhaust temperature limit is decreased at low ambient temperatures to prevent engine surge.

Referring to FIG. 2, the power controller 40, which may be digital, provides a distributed generation power networking system in which bi-directional (i.e. reconfigurable) power converters are used with a common DC bus 54 for permitting compatibility between one or more energy components. Each power converter operates essentially as a customized bi-directional switching converter configured, under the control of power controller 40, to provide an interface for a specific energy component to DC bus 54. Power controller 40 controls the way in which each energy component, at any moment, with sink or source power, and the manner in which DC bus 54 is regulated. In this way, various energy components can be used to supply, store and/or use power in an efficient manner.

The energy components, as shown in FIG. 2, include an energy source 42 such as the turbogenerator 10, utility/load 48, and storage device 50 such as a battery. A detailed block diagram of power converter 44 in the power controller 40 of FIG. 2 is illustrated in FIG. 3. The energy source 42 is connected to DC bus 54 via power converter 44. Energy source 42 may produce AC which is applied to power converter 44. DC bus 54 connects power converter 44 to utility/load 48 and additional energy components 66. Power converter 44 includes input filter 56, power switching system 58, output filter 64, signal processor 60 and main CPU 62.

In operation, energy source 42 applies AC to input filter 56 in power converter 44. The filtered AC is then applied to power switching system 58 which may conveniently be a series of insulated gate bipolar transistor (IGBT) switches operating under the control of signal processor 60 which is controlled by main CPU 62. The output of the power switching system 58 is applied to output filter 64 which then applies the filtered DC to DC bus 54.

Each power converter 44, 46, and 52 operates essentially as a customized, bi-directional switching converter under the control of main CPU 62, which uses signal processor 60 to perform its operations. Main CPU 62 provides both local control and sufficient intelligence to form a distributed processing system. Each power converter 44, 46, and 52 is tailored to provide an interface for a specific energy component to DC bus 54. Main CPU 62 controls the way in which each energy component 42, 48, and 50 sinks or sources power and DC bus 54 is regulated at any time. In particular, main CPU 62 reconfigures the power converters 44, 46, and 52 into different configurations for different modes of operation. In this way, various energy components 42, 48, and 50 can be used to supply, store and/or use power in an efficient manner.

In the case of a turbogenerator 10 as the energy source 42, a conventional system regulates turbine speed to control the output or bus voltage. In the power controller 40, the bi-directional controller functions independently of turbine speed to regulate the bus voltage.

FIG. 2 generally illustrates the system topography with the DC bus 54 at the center of a star pattern network. In general, energy source 42 provides power to DC bus via power converter 44 during normal power generation mode. Similarly, during power generation, power converter 46 converts the power on DC bus 54 to the form required by utility/load 48. During utility start up, power converters 44 and 46 are controlled by the main processor to operate in different manners. For example, if energy is needed to start the turbogenerator 10, this energy may come from load/utility48 (utility start) or from energy source 50 (battery start). During a utility start up, power converter 46 is required to apply power from load 48 to DC bus for conversion by power converter 44 into the power required by the turbogenerator 10 to start up. During utility start, the turbogenerator 10 is controlled in a local feedback loop to maintain the turbine revolutions per minute (RPM). Energy storage or battery 50 is disconnected from DC bus while load/utility grid regulates $V_{DC}$ on DC bus 24.

Similarly, in a battery start, the power applied to DC bus 54 from which turbogenerator 10 may be started, may be provided by energy storage 50. Energy storage 50 has its own power conversion circuit in power converter 52, which limits the surge current into the DC bus 54 capacitors, and allows enough power to flow to DC bus 54 to start turbogenerator 10. In particular, power converter 56 isolates the DC bus 54 so that power converter 44 can provide the required starting power from DC bus 54 to turbogenerator 10.

A more detailed description of the power controller can be found in U.S. patent application Ser. No. 207,817, filed Dec. 8, 1998 by Mark G. Gilbreth et al, entitled "Power Controller", assigned to the same assignee as this application and hereby incorporated by reference.

There are two levels of complexity relating to load management in a building with a turbogenerator: (1) load dispatch control, where the turbogenerator is either (a) shutdown or (b) operating at maximum power, and (2) load following or peak shaving, where the turbogenerator is continuously varying the power output to maintain a constant utility power output.

In the case of (1) load dispatch control, the utility power meter is programmed to send a discrete signal to the turbogenerator when a specific building load demand is exceeded. This same signal is sent to a single turbogenerator or multiple turbogenerator. In this simple control strategy, the discrete signal commands the turbogenerator(s) to maximum power if on, and commands the turbogenerator to shut down when commanded off, assuring the turbogenerators always operate at peak efficiency.

In most installations, an agreement between the utility and the consumer specifies that the turbogenerator shall not back feed or provide power to the grid at any time. Thus, a reverse power detection signal from the power meter is required to prevent reverse flow to the utility.

FIG. 4 is a block diagram of the block peak shaving mode of operation. The utility power meter 70 dispatches a discrete signal 71 and a reverse power discrete signal 73 to both power controllers/turbogenerator 72 and 74.

Variable peak shaving operation is illustrated in the block diagram of FIG. 5. In the variable peak shaving mode of operation, the utility power meter 70 dispatches independent discrete signals 76 and 77 plus independent reverse power discrete signals 78 and 79 to power controllers/turbogenerator 72 and 74 respectively. Variable peak shaving operation provides a discrete level of multiple power controller/turbogenerator power output and enables varying power setpoints to be sent to individual turbogenerator, thus providing step loading. In the peak shaving mode of operation, the utility power meter 70 provides a load management signal.

In both FIGS. 4 and 5, the number of power controllers/turbogenerators is illustrated for purposes of example only as two (2), namely 72 and 74. It should be recognized that the present invention is equally applicable to any number of power controllers/turbogenerators from one or more. The same is also true with respect to the load following modes of operation illustrated in FIGS. 8–10.

FIG. 6 illustrates a block diagram of the load following mode of operation with a utility power meter 86 supplying pulse signal inputs for real power positive direction 82 and negative direction 83 to power controller/turbogenerator 80. In addition, positive reactive power signal 84 and negative reactive power signal 85 are also provided to power controller/turbogenerator 80. This provides the load following capability plus reactive power control. In the event a negative power pulse is detected by the controller, the turbogenerator immediately shuts down, providing reverse power protection.

The load following mode of operation is illustrated in block diagram format in FIG. 7 with a serial communication input for power controllers/turbogenerators. For this configuration, the utility power meter 86 provides a digital serial communication 87 to a power controller/turbogenerators 88 which serves as a master power controller/turbogenerator, which processes the serial input 87 from the power meter 86, and commands slave power controllers/turbogenerator 89 and 90 to sequence and regulate power through intra bus digital communication. The serial communication measures both real and reactive power, but provides storage capability for measuring accumulated power while the power controller is off.

In FIG. 8, a block diagram of the control system operation for load following operation is illustrated. A utility demand signal 91 is compared with the real power feedback signal 92 from power meter 93 in a comparator 94. The compared demand signal 95 is time averaged in sample averager 96 which provides a time averaged signal 97 to a minimum power limit and dispatch hysterisis band control 98. The control 98 provides a real power demand signal 99 and a reactive power demand signal 100 to the power controller/turbogenerator 101. The power 102 from the power controller/turbogenerator 101 is compared to the building load 103 in comparator 104 which provides a signal 105 to power meter 93. As previously indicated, real power signal from the power meter 93 is fed back to comparator.

The reactive power signal 106 from power meter 93 is fed back to comparator 107 where it is compared to the utility load reactive demand 108. The compared reactive power signal 109 is time averaged in sample averager 110 with the time averaged reactive power signal 111 provided to minimum power limit and dispatch hysterisis band control 98.

A utility power setpoint allows the user to specify a utility power draw at which to regulate the system when load following mode is selected. Both a positive and negative adjustment allows for a constant utility power consumption or production. Turbine power demand is calculated using the equation below. In load following mode, the system is enabled when turbine power demand exceeds minimum power shutoff limit.

$$\text{Turbine Power Demand} = \text{Utility Power Setpoint} - \text{Utility Power Measured} \qquad (\text{Eq. 1})$$

To improve the turbogenerator performance and limit response to building load transients, the input power demand from the utility power meter is time averaged and adjustable by the customer. This feature does not apply to the reverse power protection feature previously described.

For both peak shaving and load following modes of operation, the meter 110 is arranged as shown in FIG. 9. The meter 110 receives a utility power signal 112 and provides a communication signal 120 to the controller/turbogenerator 113 which provides turbogenerator production 111 to the building load 114. In the load dispatch control mode of operation, illustrated in FIG. 10, the meter 110 measures the difference between turbogenerator production 111 from the controller/turbogenerator 113 and the utility power demand 112 for the building load 114 and directs a communication signal 120 to the turbogenerator 113.

FIG. 11 illustrates a total energy management system, including load following, peak shaving, and relay output control for controlling a plurality of loads in a building in conjunction with the power controller/turbogenerator 113. The meter 110 receives a utility power signal 112 and provides a communication signal 120 to the controller/turbogenerator 113 which provides turbogenerator production 111 to the building load 114. The building load 114 consists of a number of individual loads each having a load control relay 130, 131, and 132, respectively. Each load control relay 130, 131, and 132 provides an output 140, 141, and 142, respectively, to the controller/turbogenerator 113.

Since the individual output relays can be utilized to control any external load, such as HVAC, fans, motors, pumps and the like, this control capability, in conjunction with turbogenerator peak shaving and load following control modes, provides a total energy management solution in a single integrated package. The relay control can also be programmed by the controller to turn on and off individual loads based on a time of day or a day of week schedule FIGS. 12, 13, and 14 illustrate a load profile of turbogenerator production and building power consumption for the peak shaving, the load following, and the load dispatch modes of operation, respectively. In the peak shaving control mode, the turbogenerator output power is regulated to provide a constant utility power contribution as shown in FIG. 12.

Load following is a control mode in which the turbogenerator supplies the entire load (up to the load power generation capability of the turbogenerator) and maintains the utility contribution at zero as shown in FIG. 13.

For both load following and peak shaving applications, illustrated in FIG. 14, the load is constantly changing, thereby requiring the turbogenerator to start stop and regulate power. For example, an air conditioning unit, which can start and stop several times per hour, can be the single largest consumer of electricity in a building, resulting in start and shutdown cycles for the turbogenerator In the utility base load control mode (or peak shaving mode), the control system regulates the turbogenerator output to maintain a constant base load from the utility grid. The operator enters the utility base load setpoint, and the power controller regulates the turbogenerator so that the grid provides a constant amount of power regardless of the variations in load.

Reverse power flow protection logic immediately shuts the turbogenerator down to prevent back flow on the utility grid based on a user defined setpoint. The control logic includes dispatch logic based on a minimum operating setpoint of the turbogenerator to prevent repetitive starting and stopping of the turbogenerator.

The control system can regulate both the building or load's real power and reactive power. The power controller can adjust the reactive power output from the turbogenerator to nullify the total current supplied from the utility. For most applications, the reactive power is regulated to zero by the power controller. This feature can be activated or deactivated by the user.

The control system operates in combination with a utility grade meter. Commercially available power meters provide: (1) discrete signals for activating/deactivating loads (or in the case of a power generation system, activating/deactivating power); (2) pulse signals for monitoring and load management; and (3) digital serial communication for advanced monitoring capability. The meters are capable of providing multiple discrete signals for load management in a building. These signals can be used to dispatch one or more turbogenerator when the load in a building exceeds a particular setpoint or monitory rate schedule.

In addition to the benefits of peak shaving and load following, the digital power meter can be used to analyze and characterize building loads over an extended period of time, and generate a scheduled load profile based on predicted consumption.

The control system incorporates a mode setting to select one of three options—"disable", "peak shaving", and "load following". Peak shaving mode enables the system and operates at a user defined peak shaving power setpoint programmed in the turbogenerator controller when RUN/STOP contact is closed (the contact closes when the peak shaving setpoint programmed in the meter is exceeded).

When load following mode is selected, load following is enabled when the building or load power setpoint exceeds the utility power setting by more than the minimum power shutoff limit. A reverse power protection feature is provided to stop the turbogenerator system when input from the negative signal indicates power is being delivered to the utility. This option contains two settings that are adjustable by the user. An "enable" or "disable" setting, and an adjustable timer specifies the time allowed for reverse flow. This feature operates independent of the mode setting selected.

A minimum power user adjustment is available to prevent low power operation (low efficiency) for extended periods of time, The turbogenerator system will be shutoff when the power setpoint is less than the adjustable power setpoint for an adjustable time period until another start condition is present. This setting applies to load following only. A dispatch hysterisis band prevents start and stop cycling when the power demand is at the shutoff limit.

The capacity of the power controller to deliver reactive power is dependent on the real in power it delivers due to the controller current limit. The control system automatically limits the reactive power if the total current limit is reached. Thus, delivering real power takes precedence over delivering reactive power, based on the following relationship:

$$I_{reactive} = \sqrt{I^2_{max} - I^2_{real}} \qquad (Eq. 2)$$

Reactive power control does not require turbogenerator power generation The power controller can adjust the utility reactive power through inverter switching without power from the turbogenerator.

Since the turbogenerator and controller design allows the gas turbine engine to operate at a wide range of speeds while maintaining a fixed utility grade AC output, thereby allowing the turbogenerator to operate at or near peak efficiency over a wide range of load conditions, the load output of the turbogenerator is regulated to maximize efficiency. This provides a discernable advantage over other power generation systems that can not operate at peak efficiency over such a wide range of power output.

While specific embodiments of the invention have been illustrated and described, it is to be understood that these are provided by way of example only and that the invention is not to be construed as being limited thereto but only by the proper scope of the following claims.

What we claim is:

1. A power control system connected to an electric utility grid and a load, said system comprising:
    a power meter connected to said electric utility grid;
    at least one turbogenerator connected to said electric utility grid, said power meter, and said load, each of said at least one turbogenerator including a controller for said power meter to provide a plurality of analog pulse input signals including a real power feedback signal and a reactive power feedback signal to the controller of each of said at least one turbogenerator.

2. The power control system of claim 1, further comprising:
    a first comparator to compare said real power feedback signal with a utility load real demand signal; and
    a second comparator to compare said reactive power feedback signal with a utility load reactive demand signal.

3. The power control system of claim 2, further comprising:
    means operably associated with said first comparator to time average said compared signal from said first comparator; and
    means operably associated with said second comparator to time average said compared signal from said second comparator.

* * * * *

UNITED STATES PATENT AND TRADEMARK OFFICE
CERTIFICATE OF CORRECTION

PATENT NO. : 6,281,601 B1
DATED : August 28, 2001
INVENTOR(S) : Edward C. Edelman et al.

It is certified that error appears in the above-identified patent and that said Letters Patent is hereby corrected as shown below:

Column 1,
Line 67, after "turbogenerator", delete "," and substitute therefor -- ; --.

Column 2,
Line 28, after "meter;" delete ",".

Column 5,
Line 3, delete "turbogenerator" and substitute therefor -- turbogenerators --.
Line 22, delete "turbogenerator 72" and substitute therefor -- turbogenerators 72 --.
Line 25, delete "turbogenerator, thus" and substitute therefor -- turbogenerators, thus --.
Line 53, delete "turbogenerators 88" and substitute therefor -- turbogenerator 88 --.
Line 56, delete "controllers/turbogenerator 89" and substitute therefor -- controllers/turbogenerators 89 --.

Column 7,
Line 7, after "start" insert -- , --.

Column 8,
Line 3, after "time", delete "," and substitute therefor -- . --.
Line 10, after "real" delete "in".
Line 19, after "generation" insert -- . --.

Signed and Sealed this

Ninth Day of April, 2002

Attest:

JAMES E. ROGAN
*Director of the United States Patent and Trademark Office*

*Attesting Officer*